United States Patent
Kuo (10) Patent No.: US 7,688,480 B2
(45) Date of Patent: *Mar. 30, 2010

(54) AUTOMATIC SCANNING PARAMETER SETTING DEVICE AND METHOD

(76) Inventor: Shih-Zheng Kuo, No. 21, Alley 8, Lane 57, Yu-Hsi St., Yungho, Taipei Hsien (TW)

( * ) Notice: Subject to any disclaimer, the term of this patent is extended or adjusted under 35 U.S.C. 154(b) by 234 days.

This patent is subject to a terminal disclaimer.

(21) Appl. No.: 11/499,003

(22) Filed: Aug. 4, 2006

(65) Prior Publication Data

US 2006/0268369 A1 Nov. 30, 2006

Related U.S. Application Data

(63) Continuation of application No. 09/967,715, filed on Sep. 27, 2001, now Pat. No. 7,403,313.

(51) Int. Cl.
*H04N 1/04* (2006.01)
*H04N 1/32* (2006.01)
*H04N 1/46* (2006.01)

(52) U.S. Cl. ........................ 358/486; 358/474; 358/444; 358/442; 358/448; 358/468; 358/505

(58) Field of Classification Search ................. 358/486, 358/488, 473, 474, 465, 444, 446, 442, 505, 358/401, 501, 448, 497; 382/318, 319, 312, 382/313
See application file for complete search history.

(56) References Cited

U.S. PATENT DOCUMENTS

| | | | |
|---|---|---|---|
| 5,251,297 A | 10/1993 | Takayanagi | |
| 5,659,164 A | 8/1997 | Schmid et al. | |
| 6,028,966 A | 2/2000 | Hashimoto | |
| 6,236,770 B1 | 5/2001 | Hsieh et al. | |
| 6,298,176 B2 | 10/2001 | Longacre et al. | |
| 6,577,409 B1 | 6/2003 | Barker et al. | |
| 6,646,765 B1 | 11/2003 | Barker et al. | |
| 6,650,442 B1 | 11/2003 | Chiu | |
| 6,778,288 B1 | 8/2004 | Ogaki et al. | |
| 6,795,210 B1 | 9/2004 | Fujiwara | |
| 7,002,712 B2 | 2/2006 | Barker et al. | |

FOREIGN PATENT DOCUMENTS

GB 2350006 11/2000

*Primary Examiner*—Cheukfan Lee
(74) *Attorney, Agent, or Firm*—Stolowitz Ford Coweger LLP (57) ABSTRACT

An automatic scanning parameter setting device and method. The automatic scanning parameter setting device is a scanner that automatically sets the scanning parameters of a plurality of scan images so that scanning can be conducted in batches. The automatic scanning parameter setting device includes an image input device, an analysis device and a control unit. The image input device is attached to the scanner for inputting a plurality of scan images. A portion of the scan images contains a set parameter format. The set parameter format contains a plurality of scanning parameter values. The analysis device performs an analysis of the scan images containing recorded scan parameter values. The control unit uses the analyzed scanning parameter values to conduct a scanning parameter setting operation on the scan images having recorded scanning parameter values as well as the ordered scan images after the scan images with recorded scan parameter values but without recorded scan parameter values.

36 Claims, 4 Drawing Sheets

```
Begin:
    Scan mode : color ;
    Resolution : 600 ;
    Xstart : 0 ;
    Ystart : 0 ;
    Width : 1200 ;
    Length : 2400 ;
    Highlight : 255 ;
    Shadow : 0 ;
    Target path : c:\vistascan\image ;
End
```

```
Begin:
    Scan mode : color ;
    Resolution : 600 ;

Xstart : 0 ;
    Ystart : 0 ;

Width : 1200 ;
    Length : 2400 ;
    Highlight : 255 ;
    Shadow : 0 ;

Target path : c:\vistascan\image ;
End
```

FIG. 4

AUTOMATIC SCANNING PARAMETER SETTING DEVICE AND METHOD

CROSS-REFERENCE TO RELATED APPLICATIONS

This is a Continuation Patent Application of U.S. patent application Ser. No. 09/967,715, filed Sep. 27, 2001.

BACKGROUND OF THE INVENTION

1. Field of Invention

The present invention relates to an automatic scanning parameter setting device and method. More particularly, the present invention relates to a device and related method of extracting scanning parameters from a scan image and setting the scanning parameters automatically.

2. Description of Related Art

Nowadays, most scanners have an automatic document feeder. If the images on a whole pile of papers employ identical scanning parameters, scanning can be conducted automatically and continuously by putting the whole pile of papers into the automatic document feeder.

However, if some of the scan images that a stack of papers contains need to use different scanning parameters, a user must standby the scanner and host system for inputting the non-conforming scanning parameters so that images are scanned using optimal parameters.

When a user performs a parameter adjustment, all current scanning operations must be stopped. All scanning must stop to await the completion of the parameter-setting operation because the scanner needs to use the newly set scanning parameters Due to the need for changing scanning parameters, users have to stay besides the host system even when the scanner has an associated automatic document feeder capable of automatic document feeding.

SUMMARY OF THE INVENTION

Accordingly, one object of the present invention is to provide a device capable of setting scanning parameters automatically. The parameter setting device is a scanner having an automatic document feeder. The device is capable of automatic sorting and setting of parameters in a pile of scan papers such that the scanner can directly change scanning parameters during a multiple image scanning operation without having to set the parameters through a complicated interface via the host computer. Furthermore, there is no need to stop the scanning operation while parameters are set.

To achieve these and other advantages and in accordance with the purpose of the invention, as embodied and broadly described herein, the invention provides an automatic scanning parameter setting device. The automatic parameter scanning device includes an image input device, an analysis device and a control device.

The image input device is attached to the scanner for inputting a multiple of scan images. A portion of the scan images has a specified parameter setting format. The parameter setting format includes a plurality of scanning parameter values.

The analysis device performs a scanning parameter value analysis for those portions of the scan images having parameter setting format. The control unit utilizes the analyzed scan parameter values to conduct a scanning parameter setting operation on the scan images with recorded scan parameter values as well as a portion of the scan image ordered after the scan image with recorded scanning parameter value but without recorded scan parameter value.

This invention also provides an automatic scanning parameter setting device for extracting scanning parameters from a multiple of scan images that need to be sorted before scanning. The automatic scanning parameter setting device is a host system connected to an image input device. The image input device feeds in a multiple of scan images to the host system. The automatic scanning parameter setting device includes an analysis device and a control unit.

The analysis device performs a scanning parameter analysis of a portion of the scan images. A portion of the scan images has the specified set parameter format. The set parameter format of these scan images is used for registering scan parameter values.

The control unit utilizes the analyzed scan parameter values to conduct a scanning parameter setting operation on the scan images with recorded scan parameter values as well as a portion of the scan image ordered after the scan image with recorded scanning parameter value but without recorded scan parameter value.

This invention also provides a method of automatically setting the scanning parameters related to extracting scanning parameters from a multiple of scan images that needs to be sorted before scanning.

The automatic scanning parameter setting method includes the following steps. First, specific set parameter formats are inserted into the portion of the scan images that needs to be scanned using different scanning parameter values. The set parameter format includes the scan parameter values needed by the scan images.

Thereafter, a scanning operation is conducted. During the scanning operation, the scan images are looked at to find any scanning parameter values. If scan parameter values are found, the scan parameter value is analyzed. Finally, the scan image is scanned using these scan parameter values.

However, if a portion of the scan images has no recorded scan parameter value but is ordered after the scan images with recorded scan parameter values, these scan images are scanned according to the scan parameter values.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
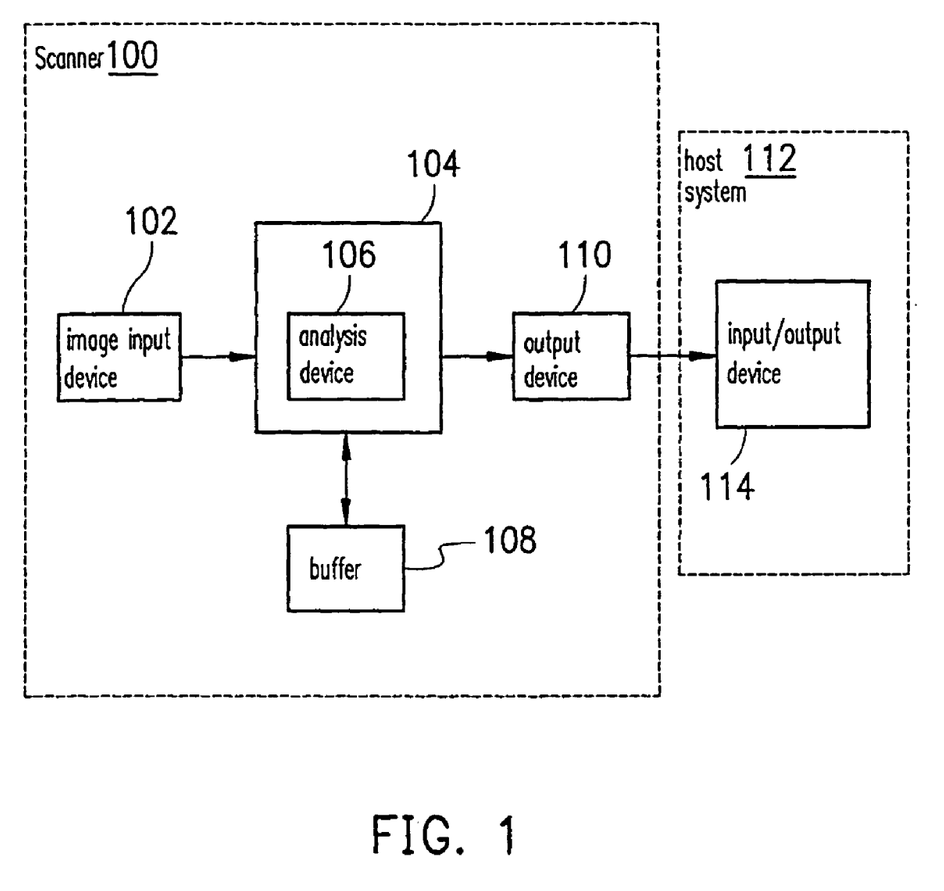
FIG. 1 is a schematic block diagram of an automatic scanning parameter setting device according to a first embodiment of this invention.

FIG. 1 is a schematic block diagram of an automatic scanning parameter setting device according to a first embodiment of this invention. This invention is related to a device for extracting scan parameter values from a batch of scan images and setting these scan images before conducting a scanning operation. The device for setting scanning parameters automatically is a type of scanner having an automatic document feeder.

The automatic scanning parameter setting device includes an image input device 102, an analysis device 106 and a control unit 104. The image input device 102 such as an automatic document feeder is mounted on the scanner for inputting scanning images. A portion of the scan images has a specified set parameter format that includes a plurality of scanning parameter values such as scan mode of an image, resolution, initial position value, image size, color brightness and target parameters of the object image.

Figure 4:
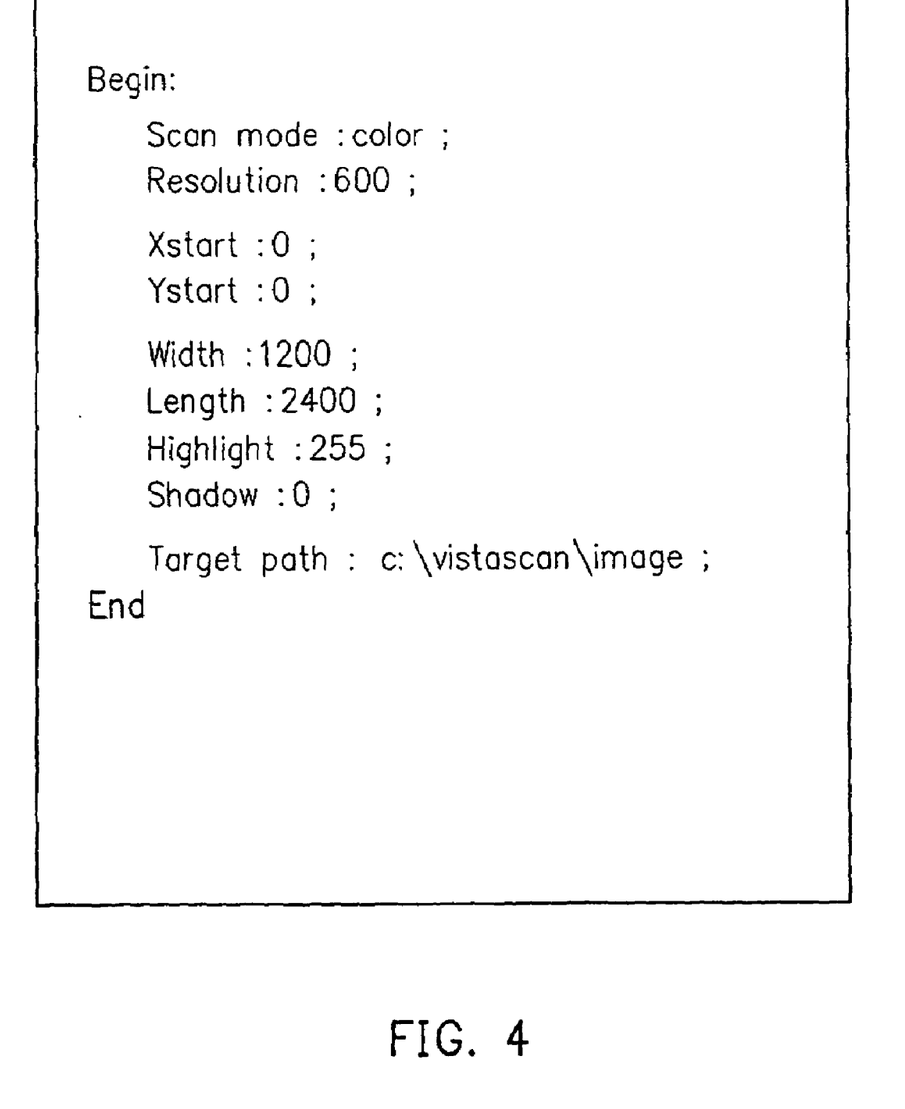
FIG. 4 is a mnemonic program for setting parameter format.

FIG. 4 is a mnemonic program for setting parameter format. The scanner sets parameters according to the set parameter format. For example, the scan mode for scanning an image is color, resolution is 600 dpi, the initial position of the image is at the zero point of the x-axis and the y-axis, the image has a width of 1200 and a length of 2400, the color brightness is at a highlight value 255, shadow value is zero and target parameter of the scan object is target path, and the location to scan the image to is c:\vistascan\image.

The scan parameter values are recorded on the scan images. Hence, when the image input device 102 inputs the scan images with the recorded scan parameters into the image input device 102, the analysis device 106 inside the scanner 100 performs a scanning parameter analysis of the scan images.

The analysis device 106 in this embodiment resides within the control unit 104. The type of analysis includes identification and comparison of all scan images containing recorded scanning parameter values. Identification and comparison operations refer to the operation by identification software on a stream of scanned text. The stream of scanned text is grafted and compared with text stored inside a pre-existing library so that text on the scan image can be recognized. In this invention, the analysis device 106 is the place for identifying scan parameter values from the images.

The control unit 104 utilizes the analyzed scan parameter values to conduct a parameter setting operation on the scan images with scan parameter values as well as a portion of the scan images ordered after the scan images but without set parameter format.

If a scan image has a set parameter format shown in FIG. 4, the control unit 104 will utilize the identified scan parameter values to set the scan parameters of this image after performing an analysis inside the analysis device 106. When the automatic document feeder transfers the next scan image and finds this image does not have set parameter format after an analysis by the analysis device 106, this indicates the user does not want any changes of the scan parameter values in the next image. Hence, the control unit 104 will use the preset scan parameter values to set the scan parameters.

In addition, because only a portion of the scan images among a pile has set parameter format, the analysis device 106 is not required to conduct a scan parameter value identification operation for each scan image. Therefore, the set parameter format must have a control label for informing the control unit 106 about the presence or the absence of recorded scan parameter values in an image.

As shown in FIG. 4, the Begin label at the very beginning of the program informs the control unit 106 about the initialization of scan parameter analysis by the analysis device 104. Similarly, the End label at the end of the program informs the control unit 106 about the completion of the scan parameter analysis. The control unit 106 may utilize the analyzed scan parameter values between the initial label and the end label to set the parameters of scan images after the set parameter format.

Hence, the analysis device 104, besides analyzing scan parameter values, must also decide beforehand whether the scan image contains scan parameter values or not. New scanning parameters for processing a scan image are determined according the presence or absence of an initialization label.

As shown in FIG. 1, the automatic scanning parameter setting device further includes a buffer 108 and an output device 110. The buffer 108 holds scanning parameter values of images not yet analyzed. In other words, after the image input device 102 receives input scan images, the control unit 104 will redirect the input images to the buffer 108 for temporary storage. Afterwards, the control unit 104 controls both the redirection of input images to the buffer 108 and the retrieval of images from the buffer 108 to the analysis device 106 for scanning parameter analysis. If the analysis device 106 finds no initializing label in the image, the control unit 104 can directly transfer subsequent image data to the output device 110 so that the output device 110 can re-direct the scan image data to a host system 112. From the input/output device 114 inside the host system 112, image data are transmitted to the appropriate image storage device according to target parameter values.

FIG. 1 also illustrates another embodiment of this invention. The scanner 100 device also includes the aforementioned image input device 102, analysis device 106 and control unit 104. However, the buffer 108 within the scanner 100 is a device for holding analyzed scan parameter values from the analysis device 106. In other words, after scan images are input into the image input device 102, the analysis device 106 first analyzes the input images to check if they contain any scanning parameter values. If there is, the scanning parameter values are stored in the buffer 108 waiting for the completion of scanning parameter analysis by the analysis device 106. After scanning parameter analysis, the control unit 104 sets the scanning parameters of the currently scanned image according to the scan parameter values stored inside the buffer 108.

If the analysis device 106 finds no scanning parameter value in the input image, the input image is not stored in the buffer 108. The control unit 104 directly sets the scanning parameter values of the image.

The control unit 104 in the aforementioned embodiment includes an application specific integrated circuit (ASIC). The ASIC is a control unit inside the scanner similar to the CPU inside a computer.

Figure 2:
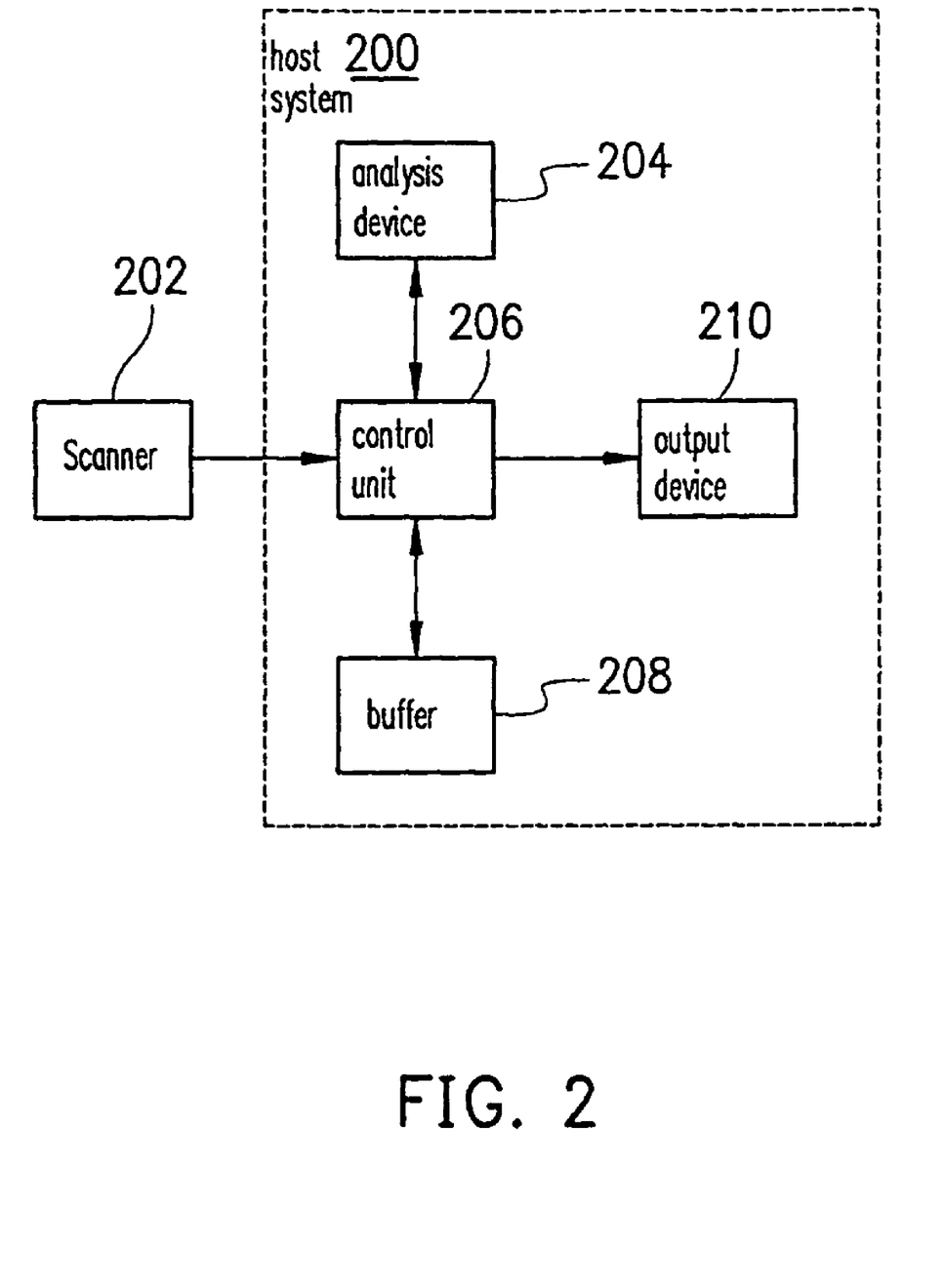
FIG. 2 is a schematic block diagram of an automatic scanning parameter setting device according to a second embodiment of this invention.

FIG. 2 is a schematic block diagram of an automatic scanning parameter setting device according to a second embodiment of this invention. As shown in FIG. 2, the automatic scanning parameter setting device is a host system 200. The host system 200 is connected to an image input device. The image input device is capable of submitting a multiple of scan images into the host system 200. In this second embodiment, the image input device includes a scanner 202 having an automatic document feeder, for example. The auto document feeder of this type of scanner can hold a stack of scan images. The automatic document feeder can move the scan image into the host system 200 one at a time.

The automatic scanning parameter setting device includes an analysis device 204 and a control unit 206. The analysis device 204 performs a scanning parameter analysis on a portion of the scan images that has a specified set parameter format as shown in FIG. 4. The set parameter format includes, for example, scan mode of images, resolution, initial position values, image sizes, color brightness and scan parameter values of target parameters.

The control unit 206 utilizes the analyzed scan parameter values to conduct a parameter setting operation on the scan images with scan parameter values as well as a portion of the scan images ordered after the scan images but without set parameter format.

The analysis device 204 is connected to the control unit 206 to determine which scan images contain scan parameter values and which scan images do not have scan parameter values and perform a scanning parameter analysis on those scan images having recorded scan parameter values. The method of analysis includes identification and comparison.

To determine if a scan image contains recorded scan image parameters, the analysis device 204 looks for a starting label such as Begin in the set parameter format shown in FIG. 4. In other words, the analysis device 204 decides whether a particular scan image has recorded scan parameter values or not according to the presence or absence of an initial label.

When the analysis device 204 finds an initial label, the analysis device 204 informs the control unit 206 about the on-going scanning parameter analysis. As the analysis device 204 reaches an end label, for example, the End label in FIG. 4, the analysis device 204 will also inform the control unit 206 about the successful completion of the scanning parameter analysis. The control unit 206 uses the analyzed scanning parameter values between the initial label and the end label to set the scan parameters of images coming after the set parameter format.

In addition, the automatic scanning parameter setting device or host system 200 further includes a buffer 208. The buffer 208 is a place for temporarily holding scan images whose scanning parameters have not yet been analyzed. In other words, when scan images are sent into the scanner 202, the control unit 206 redirects the incoming image to the buffer 208. Thereafter, the control unit 206 not only redirects the input image to the buffer 208, the control unit 208 also retrieves images from the buffer 208 to the analysis device 204 for scanning parameter analysis. If the analysis device 204 finds no initial label in a particular image, the control unit 206 will transfer the received image to a target position according to a target path.

FIG. 2 also illustrates an alternative embodiment of this invention. The host system 200 also includes the aforementioned analysis device 204 and control unit 206. However, the buffer 208 within the host system 200 is a device for holding analyzed scan parameter values from the analysis device 204. In other words, after scan images are input into the scanner 202, the analysis device 204 first analyzes the input images to check if they contain any scanning parameter values. If there is, the scanning parameter values are stored in the buffer 208 waiting for the completion of scanning parameter analysis by the analysis device 204. After scanning parameter analysis, the control unit 206 sets the scanning parameters of the currently scanned image according to the scan parameter values stored inside the buffer 208.

If the analysis device 204 finds no scanning parameter value in the input image, the input image is not stored in the buffer 208. The control unit 206 directly sets the scanning parameter values of the image.

The control unit 206 in FIG. 2 is the central processing unit (CPU) of the host system 200.

Furthermore, the aforementioned scanner is a type of scanner with an automatic document feeder. However, other types of scanners that utilize the recorded scan parameter values on the scan images and set the scanning parameters of scan images during a scanning operation are also within the scope of this invention.

Figure 3:
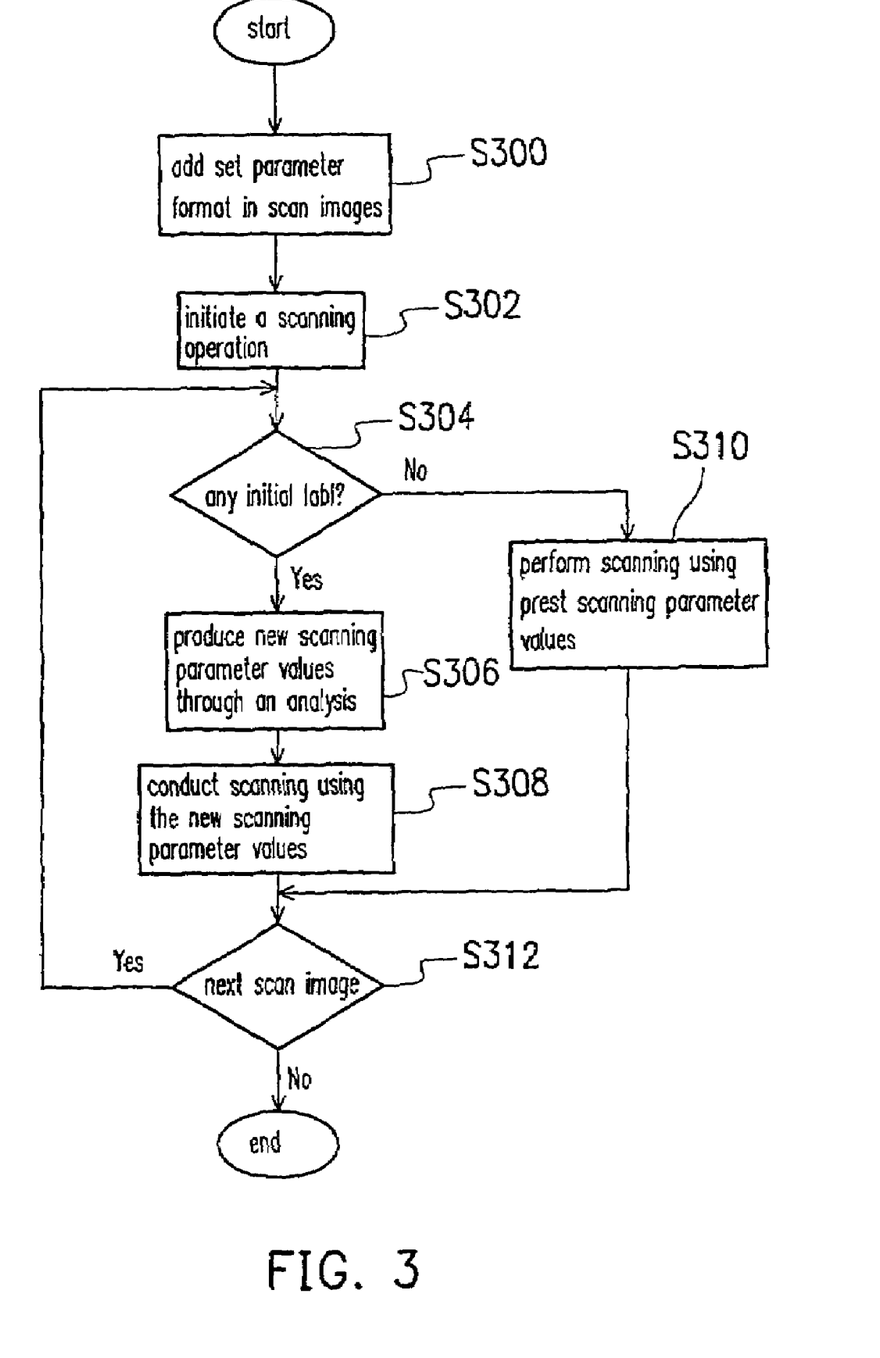
FIG. 3 is a flow diagram showing the steps for automatically setting the scanning parameters needed for a scanning operation according to this invention.

FIG. 3 is a flow diagram showing the steps for automatically setting the scanning parameters needed for a scanning operation according to this invention. The method includes extracting scan parameter values and automatically sorting out scan images for batch processing.

In step s300, a specified set parameter format is inserted into a portion of the scan images requiring a set of different scan parameter values. FIG. 4 shows a type of set parameter format. The set parameter format includes various scan parameter values attributed to a scan image including, for example, scan mode of an image, resolution, initial position value, image size, color brightness and target parameter value for scan parameter. The set parameter format further includes an initial label Begin and an end label End.

The scanning operation begins in step s302. The initial label is searched in step s304. The initial label is used for determining if the scan image contains recorded scan parameter values or not. If an initial label is found in step s304, step s306 is executed to find out what these scanning parameters are until the end label is encountered. In step s308, these scan parameter values are used to scan the current image. On the other hand, if no initial label is found in step s304, this indicates the image does not have any recorded scanning parameter values. Hence, in step s310, pre-determined scanning parameter values are used to carry out the scanning operation.

If an initial label is found in step s304, this indicates that the currently scanned image needs to have new scanning parameter values. This also means that the originally preset scanning parameter values need to be adjusted to a new set of scanning parameter values. After scanning the current image, if there are some more images waiting to be scanned in step s312 and these images do not have any scanning parameter values, the scanning parameter values in a previous scan image can be used as the scan parameter values.

In conclusion, one major advantage of this invention is the automatic re-setting of the scanning parameter values. There is no need to set up a complicated interface with a host system. As long as scanning parameter values are inserted into scan images, the invention can automatically identify and extract the scanning parameter values from the scan image so that the scanning parameter values can be used to perform the scanning operation. Furthermore, there is no need to stop the scanning operation when the scanning parameters are set.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus, comprising:
  a processing device configured to:
  scan a document to identify a scanning parameter value associated with the document;
  determine if an initial label or an end label is associated with the identified scanning parameter value;
  if the identified scanning parameter value is associated with the initial label or the end label, compare the identified scanning parameter value to a database of reference scanning parameter values to identify a scanner setting; and perform a scan job of at least a portion of the document based on the identified scanner setting.

2. The apparatus of claim 1, wherein the processing device is further configured to store an image included on the document in a buffer prior to identifying the scanner setting.

3. The apparatus of claim 1, wherein the processing device is further configured to identify the scanner setting by comparing text included on the document to reference text.

4. The apparatus of claim 1, wherein the identified scanning parameter value comprises a scan mode indication, a resolution value, an initial position value, an image size value, a color indication, a brightness value, or a target path.

5. The apparatus of claim 1, wherein the processing device is further configured to scan a portion of the document to a target path as indicated by the scanning parameter value.

6. A system, comprising:
means for inputting an image;
means for determining whether a scan format indication is present in the inputted image;
means for determining if a begin label or an end label is associated with the scan format indication;
means for identifying a scanner setting based on the scan format indication; and
means for generating an output image according to the identified scanner setting if the scan format indication is present.

7. The system of claim 6, further comprising means for generating the output image according to a previously identified scanner setting if the scan format indication is not present.

8. The system of claim 6, wherein the means for inputting an image comprises a host interface configured to transfer the image between an image input device and a host computer.

9. An apparatus, comprising:
a processing device configured to:
determine whether an initial label or an end label is associated with a scan image generated by scanning a document;
determine if a scan format indication is associated with the initial label or the end label;
obtain a scanner configuration based on the scan format indication; and
cause a new image to be generated by re-scanning the document according to the obtained scanner configuration if the scan image includes the scan format indication.

10. The apparatus of claim 9, wherein the processing device is configured to:
transfer the scan image to a target path if the scan image does not include the scan format indication; and
if the scan image includes the scan format indication and the new image is generated, receive the new image from an image input device before transferring the new image to the target path.

11. The apparatus of claim 9, wherein the scan format indication comprises a scan mode indication, a resolution indication, an initial position value, an image size indication, a color indication, a brightness indication, or a target path.

12. The apparatus of claim 9, wherein the processing device is configured to determine whether the scan image indicates the presence of an additional scan format indication.

13. The apparatus of claim 9, wherein the processing device is configured to cause the new image to be saved to a target path indicated by the scan format indication.

14. An apparatus, comprising:
means for determining if a portion of a scan image includes a scanning parameter value, wherein the scanning parameter value comprises text;
means for performing a scanning parameter analysis on the scan image, wherein the scanning parameter analysis comprises comparing the text included in the scanning parameter value to reference text; and
means for setting scanning parameters based, at least in part, on the scanning parameter analysis.

15. The apparatus of claim 14, further comprising means for storing the scan image in a buffer prior to said performing the scanning parameter analysis.

16. The apparatus of claim 14, wherein said performing the scanning parameter analysis is based, at least in part, on comparison of the scan image to a reference image.

17. The apparatus of claim 14, further comprising means for determining whether the scan image indicates a presence of an additional scanning parameter value.

18. An apparatus, comprising:
identify text on a document as a scan parameter value;
associate the scan parameter value with at least one scan image;
compare the text on the document to reference text to correlate the scan parameter value to a reference value to identify a scanner configuration; and
cause a scanned image to be generated by causing a scanning operation to be performed based, at least in part, on the identified scanner configuration.

19. The apparatus of claim 18, wherein the processing device is configured to cause the scanning operation to be performed according to a default scanner configuration if the scan parameter value is absent.

20. The apparatus of claim 18, wherein the processing device is configured to determine if an initial label is associated with the scan image.

21. The apparatus of claim 18, wherein the processing device is configured to cause the scanning operation to be performed according to a previously determined scanner configuration if the scan parameter value is absent.

22. The apparatus of claim 18, wherein the scan parameter value is a scan mode indication, a resolution indication, an initial position value, an image size indication, a color indication, a brightness indication, or a target path.

23. The apparatus of claim 22, wherein the processing device is configured to cause the scanned image generated by the scanning operation to be saved to a target path indicated by the reference text.

24. An apparatus, comprising:
a processing device configured to:
scan an input document and identify text on the input document as a scan format indication associated with the input document;
perform a scanning parameter analysis, wherein the scanning parameter analysis includes comparing the identified text to reference text to identify a scanning parameter value;
determine a scanner configuration based on the scanning parameter value; and
generate a scanned image based on the scanner configuration.

25. The apparatus of claim 24, wherein the identified scanning parameter value comprises a scan mode, a resolution, an initial position, an image size, a color, a brightness, or a target path.

26. The apparatus of claim 24, wherein the processing device is further configured to save the scanned image to a target path as indicated in the identified text.

27. The apparatus of claim 24, wherein the processing device is further configured to perform scanning in accordance with a preset scanner configuration if the input document does not include the scan format indication.

28. The apparatus of claim 24, wherein the processing device is further configured to perform scanning in accordance with a previously obtained scanner configuration associated with a previous image if the input document does not include the scan format indication.

29. A method of operating a scanner, comprising:
 determining whether an image of a document includes a scan format indication, wherein the scan format indication includes text; and
 if the image does include the scan format indication, performing a scanning parameter analysis, wherein the scanning parameter analysis includes:
 comparing the text to reference text to identify a scanning parameter value corresponding to the included scan format indication;
 determining a scanner configuration based on the scanning parameter value; and
 scanning the document in accordance with the determined scanner configuration.

30. The method of claim 29, further comprising scanning the document in accordance with a preset scanner configuration if the image does not include the scan format indication.

31. The method of claim 29, further comprising scanning the document in accordance with a previously determined scanner configuration associated with a previous image if the image does not include the scan format indication.

32. The method of claim 29, wherein the scan format indication includes a beginning label or an end label.

33. The method of claim 29, wherein the identified scanning parameter value comprises a scan mode, a resolution, an initial position, an image size, a color, a brightness, or a target path.

34. An apparatus, comprising:
 a processing device configured to:
 scan an input document and identify text on the input document as a parameter-setting format associated with the input document;
 identify a target path as indicated by the identified text; and
 store a scanned image associated with the document by saving the scanned image in a storage location indicated by the target path.

35. The apparatus of claim 34, wherein the identified text includes a folder name corresponding to the target path.

36. The apparatus of claim 34, wherein the identified text identifies a storage drive corresponding to the target path.

* * * * *

UNITED STATES PATENT AND TRADEMARK OFFICE
CERTIFICATE OF CORRECTION

| | | |
|---|---|---|
| PATENT NO. | : 7,688,480 B2 | Page 1 of 1 |
| APPLICATION NO. | : 11/499003 | |
| DATED | : March 30, 2010 | |
| INVENTOR(S) | : Kuo | |

It is certified that error appears in the above-identified patent and that said Letters Patent is hereby corrected as shown below:

Title Page at section (74), please replace "Coweger" with --Cowger--.

Signed and Sealed this

Ninth Day of November, 2010

David J. Kappos
*Director of the United States Patent and Trademark Office*